(12) United States Patent
Michel et al.

(10) Patent No.: US 11,066,041 B2
(45) Date of Patent: Jul. 20, 2021

(54) BELT RETRACTOR

(71) Applicant: TRW AUTOMOTIVE GMBH, Alfdorf (DE)

(72) Inventors: Frederic Michel, Schwäbisch Gmünd (DE); Pawel Patyk, Czestochowa (PL)

(73) Assignee: TRW AUTOMOTIVE GMBH, Alfdorf (DE)

(*) Notice: Subject to any disclaimer, the term of this patent is extended or adjusted under 35 U.S.C. 154(b) by 228 days.

(21) Appl. No.: 16/309,961

(22) PCT Filed: May 31, 2017

(86) PCT No.: PCT/EP2017/063082
§ 371 (c)(1),
(2) Date: Dec. 14, 2018

(87) PCT Pub. No.: WO2017/220297
PCT Pub. Date: Dec. 28, 2017

(65) Prior Publication Data
US 2019/0210556 A1      Jul. 11, 2019

(30) Foreign Application Priority Data

Jun. 20, 2016  (DE) .................... 10 2016 007 431.0

(51) Int. Cl.
*B60R 22/41*   (2006.01)
*B60R 22/40*   (2006.01)

(52) U.S. Cl.
CPC .............. *B60R 22/41* (2013.01); *B60R 22/40* (2013.01); *B60R 2022/401* (2013.01)

(58) Field of Classification Search
CPC .... B60R 22/40; B60R 22/41; B60R 2022/401
See application file for complete search history.

(56) References Cited

U.S. PATENT DOCUMENTS

| | | | |
|---|---|---|---|
| 5,505,400 A | 4/1996 | Boelstler et al. | |
| 7,090,304 B2 | 8/2006 | Delventhal et al. | |
| 8,662,538 B2 | 3/2014 | Specht et al. | |
| 2005/0133652 A1 | 6/2005 | Kielwein | |
| 2012/0111985 A1* | 5/2012 | Specht .................... B60R 22/41 |
| | | | 242/383.1 |
| 2012/0303219 A1 | 11/2012 | Osada et al. | |
| 2018/0126948 A1 | 5/2018 | Michel | |

FOREIGN PATENT DOCUMENTS

| | | |
|---|---|---|
| DE | 102006037544 | 2/2008 |
| WO | 2011009608 | 1/2011 |

* cited by examiner

*Primary Examiner* — Sang K Kim
(74) *Attorney, Agent, or Firm* — Tarolli, Sundheim, Covell & Tummino LLP

(57) ABSTRACT

The invention describes a belt retractor for a vehicle seat belt comprising a belt reel (12) supported for rotation in a frame, a sensor (16) for vehicle-sensitive blocking of the belt reel (12) and a mechanism (17) for disabling the sensor (16). Via a gear (18) supported for rotation on the frame and a cam follower (22) the belt reel (12) acts on the mechanism (17) for disabling the sensor (16) and can adjust the same.

19 Claims, 4 Drawing Sheets

BELT RETRACTOR

RELATED APPLICATIONS

This application corresponds to PCT/EP2017/063082, filed May 31, 2017, which claims the benefit of German Application No. 10 2016 007 431.0, filed Jun. 20, 2016, the subject matter of which are incorporated herein by reference in their entirety.

BACKGROUND OF THE INVENTION

The invention relates to a belt retractor for a vehicle seat belt comprising a belt reel being supported for rotation in a frame, a sensor for vehicle-sensitive blocking of the belt reel and a mechanism for disabling the sensor.

Belt retractors for vehicle seat belts are generally known in prior art. The vehicle seat belt is optionally retracted to or withdrawn from a belt reel.

For safety reasons, in particular situations withdrawal of the vehicle seat belt must be prevented. This is especially the case when a vehicle is involved in a crash or is otherwise strongly decelerated. In such case, the vehicle seat belt must retain the vehicle occupant buckled up with the vehicle seat belt efficiently on his/her seat.

Known belt retractors for this purpose comprise a sensor, as already mentioned in the beginning. Usually said sensor comprises an inertia mass which typically is a metal ball. In the case of strong accelerations or strong decelerations, said metal ball deflects a sensor lever and thus blocks the belt reel.

Said blocking of the belt reel is not desired in any situation, however, in which strong accelerations or strong decelerations are occurring; therefore, mechanisms for disabling said sensor are known from prior art. Such mechanism ensures the vehicle-sensitive sensor to be selectively disabled and thus prevents the belt reel from being blocked.

Moreover, the inertia mass of the sensor usually makes noise when it is moving. Such noise can be found disturbing by the vehicle occupants. This is especially the case when the belt retractor is configured for a backseat application and is mounted in the rear shelf. Then the belt retractor is located in the direct environment of the head of occupants taking a seat on the backseat. In this way, the noise caused by the sensor is clearly perceptible. In order to prevent said noise development, equally mechanisms for disabling the sensor are used.

A belt retractor of the type mentioned in the beginning is known from DE 10 2006 037 544 A1. In said belt retractor a cam follower is connected to the belt reel via a friction coupling. The cam follower thus can be driven by rotation of the belt reel via frictional resistance. The cam follower acts on an adjustable element by which a sensor lever of a sensor for detecting a vehicle condition can be blocked. The sensor lever is blocked especially when the seat belt is not fastened by a vehicle occupant and when the seat belt is just being wound onto the belt reel. Hence, the sensor lever is released only when the belt reel is rotated in a withdrawing direction.

Another belt retractor comprising a vehicle-sensitive sensor adapted to be disabled is known from U.S. Pat. No. 7,090,304 B2. In said belt retractor a lever arm adapted to block the vehicle-sensitive sensor is operatively connected to the belt reel via a control disk and a gear system.

SUMMARY OF THE INVENTION

It is the object of the present invention to further improve a belt retractor of the type mentioned in the beginning. The belt retractor is intended to make little disturbing noise. Moreover, the belt retractor is intended to have a simple structure and to be reliable as to its function. The object is achieved by a belt retractor of the type mentioned in the beginning in which the belt reel acts, via a gear supported for rotation to the frame and a cam follower, upon the mechanism for disabling the sensor and can adjust the latter. Supported to the frame in this context means that the pivot axis of the gear is fixed relative to the frame. The gear helps to create gear transmission or reduction between the movement of the belt reel and that of the cam follower. In this way, the forces acting upon the cam follower and thus upon the mechanism for disabling the sensor can be accurately adjusted. At the same time, in this way the translation and/or rotation paths of said elements can be adjusted. The mechanism for disabling the sensor is thus actuated very precisely. This entails a reliable function of the same. Moreover, in this way the components of the mechanism for disabling the sensor are constantly maintained at a defined position by a defined force. This helps to avoid undesired movements of the components, allowing to at least reduce disturbing noise. In this way, a vehicle occupant is not disturbed by said noise.

Of preference, the gear interacts with a pinion supported on the belt reel in a rotationally fixed manner via external teeth. The mating gears ensures simple reliable and low-wear functional coupling of the gear to the belt reel. Moreover, via the number of teeth of the gear and/or the pinion a gear transmission or reduction can be realized. In addition, the mating gears reduces disturbing noise as it does not include any loose elements.

In accordance with one embodiment, the mechanism for disabling the sensor comprises a blocking lever supported for rotation which is adjustable between a disabling position in which it acts on a holding surface of the sensor and a release position in which it is spaced apart from the holding surface. Thus, a simple and reliable option for disabling the sensor is given. By acting on the holding surface of the sensor, at least a reduction of the noise caused by the sensor is effectuated.

In one configuration variant, the cam follower includes first and second contact faces interacting with the blocking lever to adjust the latter between the disabling position and the release position, with the contact faces being preferably arranged to be adjacent each other. The blocking lever is thus constantly provided in a defined position at the cam follower and thus in total in a defined position. In this way, disabling is reliably realized. Moreover, the defined positioning reduces noise or even prevents it from developing.

In addition, the cam follower may comprise two stop faces offset in the circumferential direction to limit a movement of rotation of the cam follower relative to the blocking lever. The cam follower and the blocking lever thus are provided in a defined position relative to each other even with respect to rotation.

Of preference, the blocking lever is preferably biased by a spring in one direction for disabling the sensor. This helps to efficiently suppress disturbing noise of the belt retractor and of the mechanism for disabling the sensor.

In one embodiment, a rotary motion of the belt reel is coupled to a rotary motion of the cam follower via a friction coupling, the friction coupling having a spring which biases at least one friction element so that a predetermined friction moment is generated between an input and an output of the friction coupling, with the spring being preferably a coil spring made from metal. Springs, especially coil springs made from metal, usually are designed so that they do not show signs of either fatigue or settlement. For these reasons, the predetermined friction moment is kept constant over the entire service life of the belt retractor. This results in a constantly reliable function of the belt retractor and of the mechanism for disabling the sensor for vehicle-sensitive blocking of the belt reel. Further, noise emitted by the sensor or by the mechanism for disabling the sensor is avoided or at least reduced so that vehicle occupants are not disturbed by said noise.

The friction element may be formed integrally with the cam follower. The friction element and the cam follower can be manufactured by plastic injection molding, for example. Thus, low-cost manufacture is possible.

Preferably, the spring is disposed between two friction elements and the friction elements are biased in opposite directions. The force is thus applied substantially symmetrically. This may result in a substantially identical behavior of the friction coupling in both directions of rotation. Equally, the parts of the friction coupling are loaded symmetrically or at least uniformly so that wear is prevented and a long service life is achieved. In a preferred variant, the friction element interacts with a friction surface disposed on the gear. The gear and the friction element are coupled in a simple and reliable manner in this way. Moreover, a compact structure is resulting.

In addition, the gear may be arranged in ring shape and the friction surface may be arranged at the inner periphery thereof. Consequently, only small space is required by the mechanism for disabling the sensor. Advantageously, the friction surface is ring-shaped. Thus, the friction moment is kept constant independently of the angular position or rotary position of the friction surface of the friction coupling. Moreover, equal friction behavior can thus be ensured in both directions of rotation. This ensures high reliability of the belt retractor and the mechanism for disabling the sensor.

Of preference, the friction surface is formed by at least one wall of a peripheral groove and the groove preferably has a V-shaped cross-section. A groove constitutes an easy and inexpensive way to realize the friction surface. The angle at which the walls can be aligned with each other in a V-shaped groove helps to additionally influence the friction behavior of the friction coupling.

In one variant, the at least one friction element is received at least partially in the groove and the portions of the friction element received in the groove are configured to correspond to the cross-section of the groove. In this way, the friction element is safely supported and can perform its function in a trouble-free manner even in the case of shocks and vibrations which may occur within the vehicle. Moreover, a large-area contact is made between the friction element and the walls of the groove. Hence, a very high friction moment can be generated, although only a relatively small space is required for the same.

The friction element may be an elastic circular-arc shaped friction arm. Said friction arm is adapted to the friction surface disposed at the inner circumference of the rotatable gear. The friction arm may be made from synthetic material, for example, by means of injection molding. Thus, it can be manufactured at low cost while still being reliable.

BRIEF DESCRIPTION OF THE DRAWINGS

Hereinafter, the invention will be illustrated by way of the enclosed drawings, wherein.

DESCRIPTION

Figure 1:
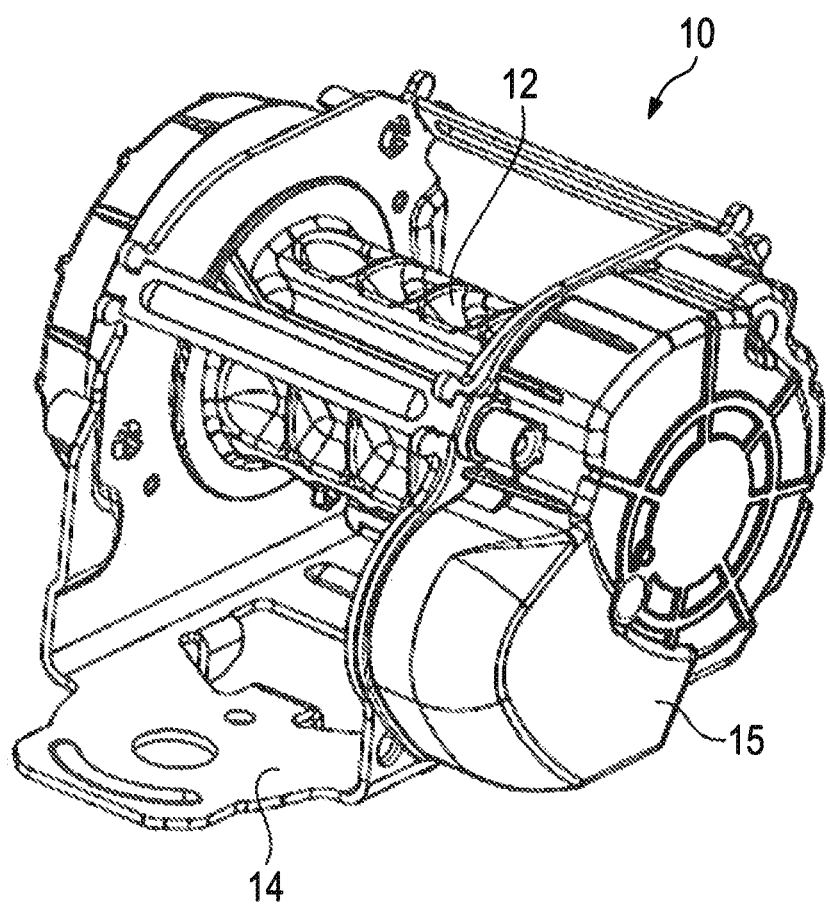
FIG. 1 shows a belt retractor according to the invention in a perspective view.

FIG. 1 illustrates a belt retractor 10 comprising a belt reel 12 being supported for rotation to a frame 14. In addition, a housing cover 15 is attached to the frame 14. A vehicle seat belt is not shown for reasons of clarity.

Figure 2A:
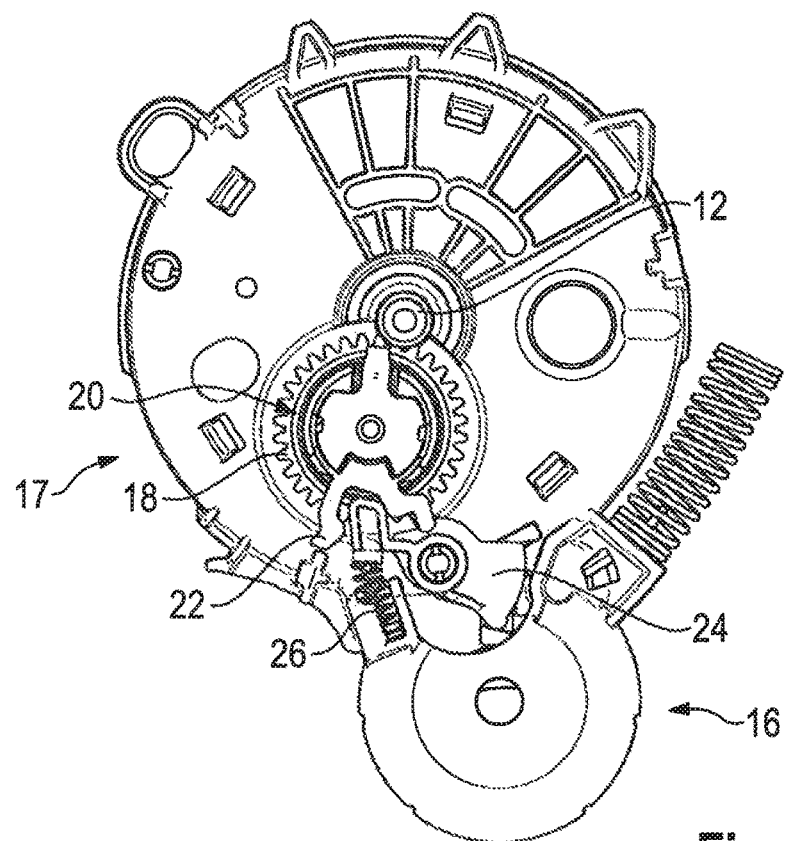
FIG. 2a shows a side view of the belt retractor according to the invention of FIG. 1 in which the sensor is disabled and in which several parts are omitted for reasons of clarity.

FIG. 2a illustrates the belt retractor 10 in a side view with the housing cover 15 being removed. Here a sensor 16 for vehicle-sensitive blocking of the belt reel and a mechanism 17 for disabling the sensor 16 are evident.

On the belt reel 12 a pinion (not shown) is arranged in a rotationally fixed manner. The latter interacts with a gear 18. A cam follower 22 is connected for rotation to the gear 18 via a friction coupling 20 and thus via the friction moment prevailing in the friction coupling 20.

The cam follower 22 is coupled to a blocking lever 24 supported for rotation and being biased via a spring 26 in the direction of the cam follower 22. The blocking lever 24 constitutes a disabling element for the sensor 16 and is part of the mechanism 17 for disabling the sensor 16.

Hence, via the gear 18 and the cam follower 22 the belt reel 12 acts on the mechanism 17 for disabling the sensor 16 and can adjust the latter.

Figure 2B:
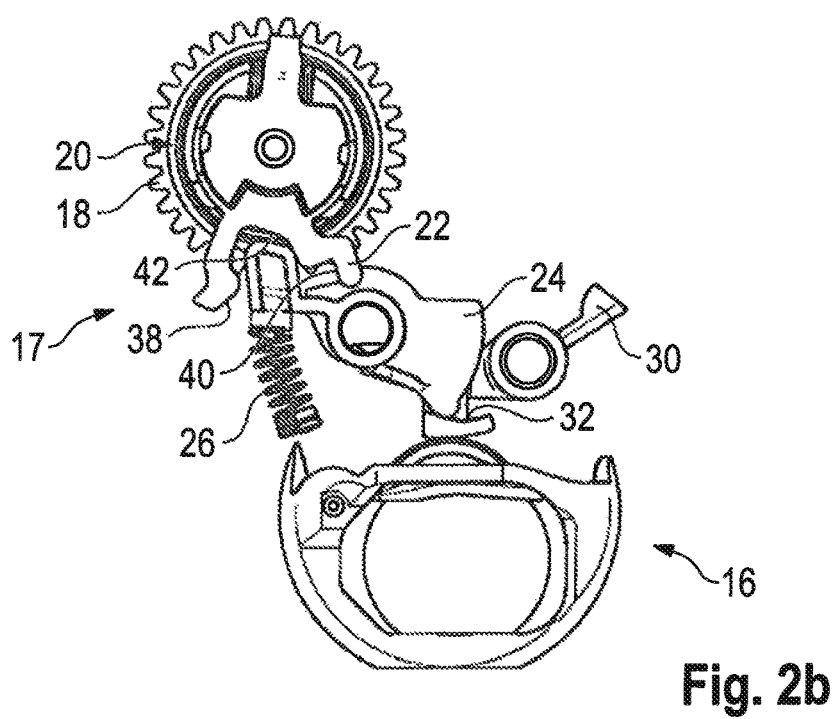
FIG. 2b shows a cutout from FIG. 2a, wherein various component parts are omitted for the sake of better clarity.

FIG. 2b in detail illustrates the functional chain from the gear 18 via the friction coupling 20 and the cam follower 22 to the blocking lever 24. Moreover, in FIG. 2b the vehicle-sensitive sensor 16 is evident. It may swivel a sensor lever 30 supported for rotation and thus effectuate blocking of the belt reel 12.

In FIGS. 2a and 2b, the blocking lever 24 is shown in a disabling position. In said position, the blocking lever 24 contacts a holding surface 32 of the sensor lever 30. As a consequence, the sensor lever 30 cannot be swiveled to a position in which it blocks the belt reel 12.

Figure 3A:
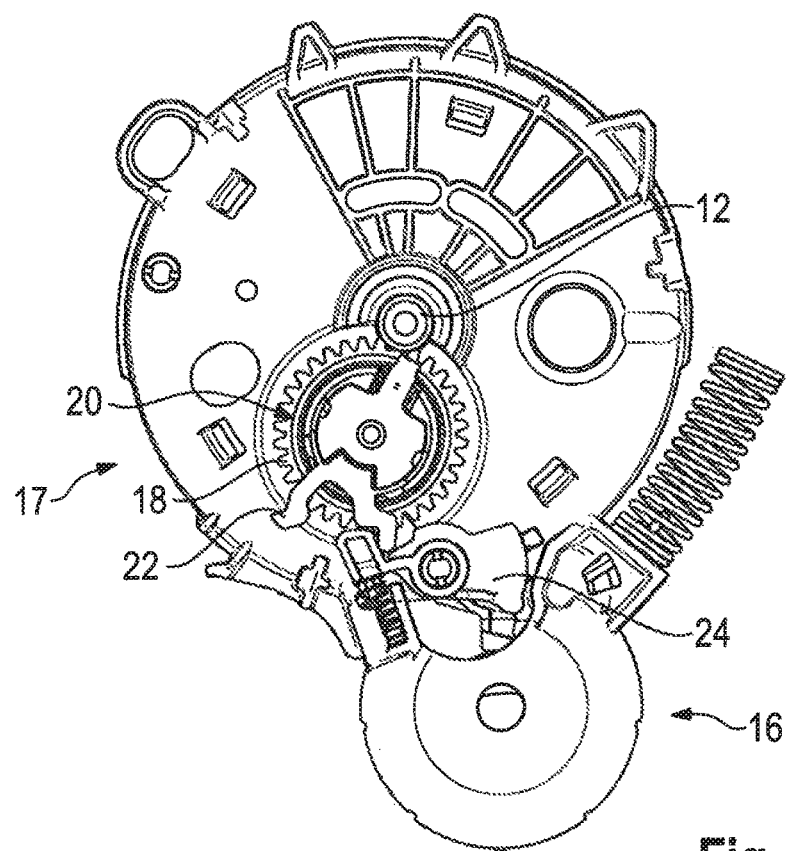
FIG. 3a shows a side view of the belt retractor according to the invention from FIG. 1 in which the sensor is not disabled and in which several parts are omitted for reasons of clarity.

In FIG. 3a, the same cutout as in FIG. 2a is shown. However, the blocking lever 24 is present in a release position. In said position, the blocking lever 24 is lifted off or spaced apart from the holding surface 32 of the sensor lever 30.

As a consequence, in this position the sensor lever 30 is released so that, upon triggering of the sensor 16, the sensor lever 30 may be swiveled and the movement of the belt reel 12 may be blocked.

FIG. 3b again shows the functional chain from the gear 18 to the sensor lever in an isolated manner.

Figure 3B:
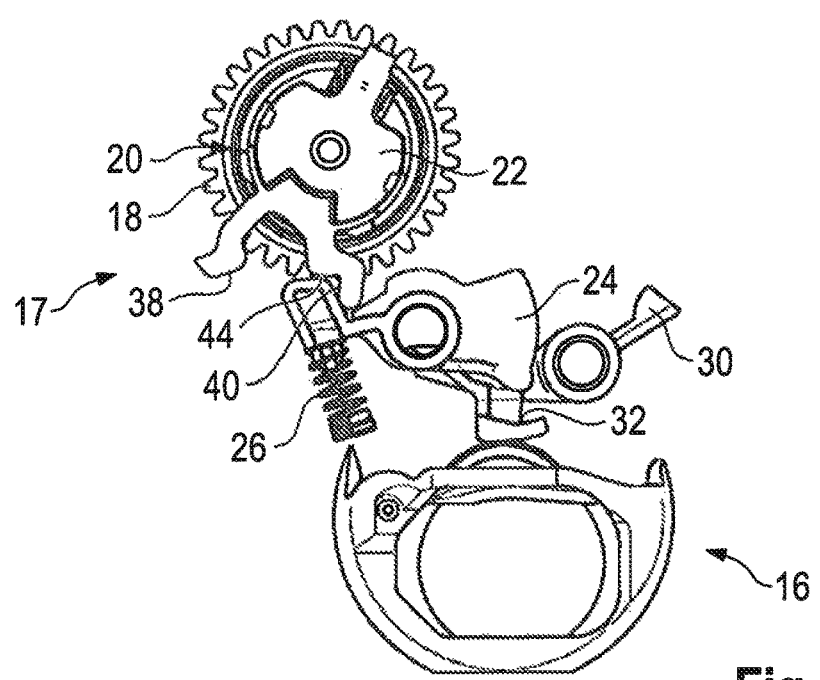
FIG. 3b shows a cutout from FIG. 3a, wherein various components are omitted for the sake of better clarity.
Figure 4:
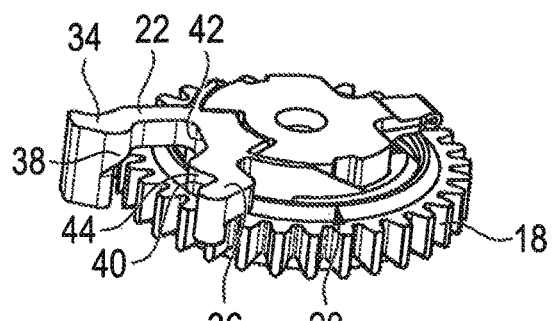
FIG. 4 shows a friction coupling and a cam follower of the belt retractor according to the invention from FIG. 1.
Figure 5:
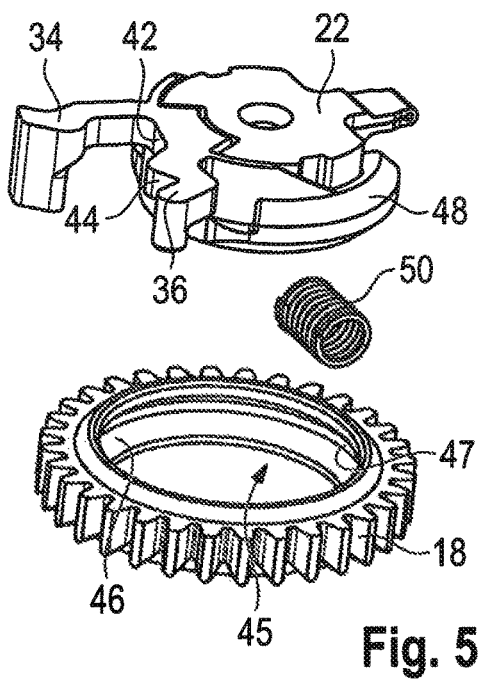
FIG. 5 shows an exploded view of the cam follower and of the friction coupling from FIG. 4.

FIGS. 4 and 5 illustrate the cam follower 22 and the gear 18 in detail. Two arms 34, 36 between which an arm of the blocking lever 24 on the cam follower side is provided in the mounted state (cf. FIGS. 2b and 3b).

When viewed in the circumferential direction, the arm 34 constitutes a first stop face 38 for the blocking lever 24 and the arm 36 constitutes a second stop face 40 for the blocking lever 24.

In the disabling position of the blocking lever 24 shown in FIGS. 2a and 2b, the arm of the blocking lever 24 on the cam follower side abuts on the stop face 38.

In the release position of the blocking lever 24 shown in FIGS. 3a and 3b, the arm of the blocking lever 24 on the cam follower side abuts on the stop face 40.

In the radial direction, the cam follower 22 forms a first stop face 42 and a second stop face 44. In the disabling position according to FIGS. 2a and 2b, the arm of the blocking lever 24 on the cam follower side abuts on the first stop face 42.

In the release position shown in FIGS. 3a and 3b, the arm of the blocking lever 24 on the cam follower side abuts on the second stop face 44.

Due to the spring load of the blocking lever 24 by the spring 26, the arm of the blocking lever 24 on the cam follower side constantly abuts on either of the two contact faces 42, 44.

FIG. 5 illustrates the cam follower 22 and the gear 18 in an exploded view. At an inner circumference 45 of the gear 18 a ring-shaped friction surface 46 is realized. The latter is formed by the walls of a peripheral groove 47.

Two friction elements 48 corresponding to the geometry of the friction surface are arranged on the cam follower 22. A cross-section of the friction elements 48 thus is substantially corresponding to a cross-section of the groove 47.

In the shown embodiment, the friction elements 48 are formed integrally with the cam follower 22.

The friction elements 48 are biased in opposite directions by a coil spring 50. In the mounted state, the coil spring 50 thus biases the two friction elements 48 in the direction of the groove bottom. In this manner, the friction elements 48 are also pressed against the walls of the groove 47 so that a frictional connection is formed there.

Figure 6:
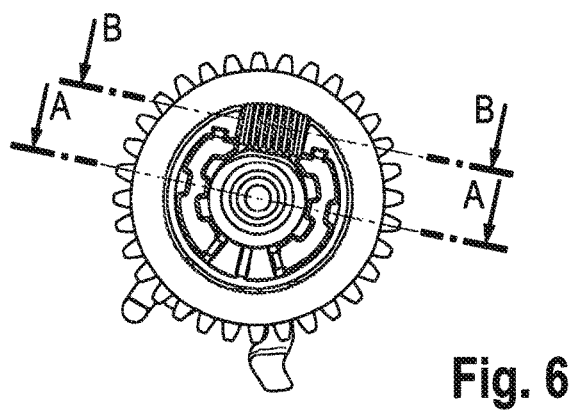
FIG. 6 shows a view of the cam follower and of the friction coupling of the belt retractor according to the invention from a perspective opposed with respect to FIG. 4.
Figure 7:
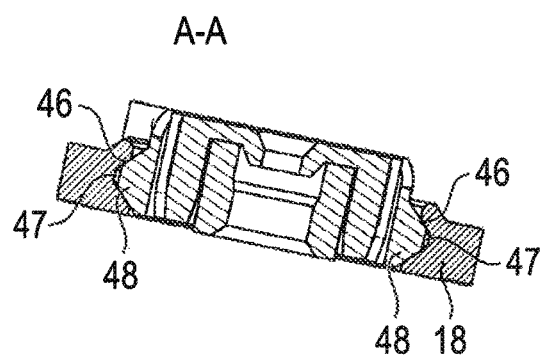
FIG. 7 shows a section along the line A-A from FIG. 6.
Figure 8:
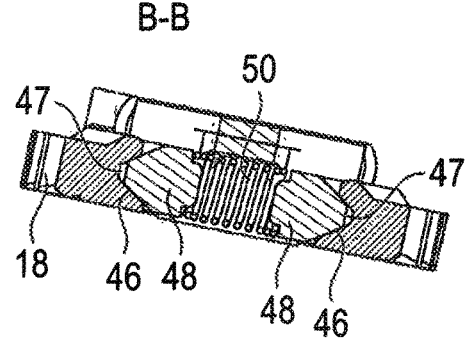
FIG. 8 shows a section along the line B-B from FIG. 6.

From FIGS. 7 and 8 which are sectional views from FIG. 6, it is evident that the groove 47 has a V-shaped cross-section. The friction elements 48 are equally V-shaped in section so that they correspond to the cross-section of the groove 47. The friction elements 48 are elastic circular arc-shaped friction arms so that they can be elastically deformed by the coil spring 50 and can be pressed into the groove 47.

Starting from a release position of the blocking lever 24 as shown in FIGS. 3a and 3b, the function of the belt retractor and of the mechanism 17 for disabling the sensor is as follows.

In the release position of the blocking lever 24 shown in FIGS. 3a and 3b, the sensor lever 30 can be moved by the sensor 16. Hence the sensor 16 is not blocked and thus can block the belt reel 12 in a vehicle-sensitive manner.

By rotating the belt reel 12, the blocking lever 24 now can be transferred to a disabling position. Via the gear 18 supported for rotation on the frame 14 and the cam follower 22 the belt reel 12 acts on the blocking lever 24 which is part of the mechanism 17 for disabling the sensor 16.

The mechanism 17 for disabling the sensor 16 can be adjusted via said functional chain.

To this end, the belt reel 12 is rotated clockwise in FIGS. 3a and 3b. Said rotation corresponds, e.g., to retracting the vehicle seat belt. During retraction, disabling of the sensor 16 is desired to minimize noise.

The pinion arranged on the belt reel in a rotationally fixed manner forms mating gears with the gear 18 so that the gear 18 rotates anti-clockwise.

Since the cam follower 22 is coupled via the friction coupling to the gear 18, the cam follower 22 is equally rotated anti-clockwise. The arm of the blocking lever 24 on the cam follower side slides from the contact face 44 in the direction of the contact face 42 and, as it is loaded by the spring 26, it abuts on the contact face 42.

Subsequently, the opposite arm of the blocking lever 24 contacts the holding surface 32 of the sensor lever 30 and in this way blocks deflection of the sensor lever 30. Thus, the sensor 16 is disabled.

When the belt reel 12 and thus the gear 18 are continued to be rotated, the cam follower 22 is swiveled via the friction coupling 20 until the arm of the blocking lever 24 on the cam follower side abuts against the stop face 38 of the cam follower 22. Then the cam follower 22 cannot continue rotating anti-clockwise due to the blocking by the blocking lever 24.

The belt reel 12 and the gear 18 may continue to be rotated, however, on the proviso that the torque causing the rotary motion is higher than the torque which can be transmitted by the friction coupling 20. The friction coupling 20 then will slip, i.e. it will open.

When, starting from this position in which the blocking lever 24 is in a disabling position and which is shown in FIGS. 2a and 2b, the belt reel 12 is rotated anti-clockwise, the cam follower 22 is rotated clockwise via the mating gears of the pinion and the gear 18 as well as via the friction coupling 20.

The arm of the blocking lever 24 on the cam follower side slides from the contact face 42 in the direction of the contact face 44 and contacts the latter. At the same time, the blocking lever 24 is swiveled anti-clockwise so that it lifts off the holding surface 32 of the sensor lever 30.

The disabling of the sensor 16 is reversed in this way.

When the belt reel 12 and thus the pinion and the gear 18 are continued to be rotated, the cam follower 22 is driven with said rotary motion until the arm of the blocking lever 24 on the cam follower side abuts on the stop face 40.

After that, the friction coupling 20 starts to slip analogously to the foregoing description, if the respective torque conditions are given.

The invention claimed is:

1. A belt retractor for a vehicle seat belt comprising a belt reel supported for rotation in a frame, a sensor for vehicle-sensitive blocking of the belt reel, a mechanism for disabling the sensor, a gear supported for rotation on the frame, and a cam follower connected to the gear by a friction coupling, the friction coupling causing the cam follower to rotate with the gear, the friction coupling permitting relative rotation between the gear and the cam follower when a friction moment of the friction coupling is overcome, the belt reel acting on and adjusting the mechanism for disabling the sensor via the gear, the friction coupling and the cam follower.

2. The belt retractor according to claim 1, wherein the gear interacts with a pinion supported on the belt reel in a rotationally fixed manner via external teeth.

3. The belt retractor according to claim 1, wherein the mechanism for disabling the sensor comprises a blocking lever supported for rotation which is adjustable between a disabling position in which it acts on a holding surface of the sensor and a release position in which it is spaced apart from the holding surface.

4. The belt retractor according to claim 3, wherein the cam follower includes first and second stop faces interacting with the blocking lever to adjust the latter between the disabling position and the release position, with the stop faces being arranged to be adjacent each other.

5. The belt retractor according to claim 3, wherein the cam follower comprises two stop faces offset in the circumferential direction for limiting a rotary motion of the cam follower relative to the blocking lever.

6. The belt retractor according to claim 3, wherein the blocking lever is biased in a direction for disabling the sensor by a spring.

7. The belt retractor according to claim 1, wherein a rotary motion of the belt reel is coupled to a rotary motion of the cam follower by means of the friction coupling, the friction coupling having a spring which biases at least one friction element so that the friction moment is generated between an input and an output of the friction coupling, wherein the spring is a coil spring made from metal.

8. The belt retractor according to claim 7, wherein the at least one friction element is formed integrally with the cam follower.

9. The belt retractor according to claim 7, wherein the spring is arranged between two friction elements and biases the friction elements in opposite directions.

10. The belt retractor according to claim 7, wherein the at least one friction element interacts with a friction surface arranged on the gear.

11. The belt retractor according to claim 10, wherein the gear is ring-shaped and the friction surface is arranged on the inner circumference thereof.

12. The belt retractor according to claim 11, wherein the friction surface is ring-shaped.

13. The belt retractor according to claim 10, wherein the friction surface is formed by at least one wall of a peripheral groove and the groove preferably has a V-shaped cross-section.

14. The belt retractor according to claim 13, wherein the at least one friction element is at least partially received in the groove and the portions of the friction element received in the groove are designed to be corresponding to the cross-section of the groove.

15. The belt retractor according to claim 7, wherein the at least one friction element is in the form of an elastic circular arc-shaped friction arm.

16. The belt retractor according to claim 1, wherein the friction coupling includes the at least one friction element and a spring that biases the at least one friction element into engagement with the gear.

17. The belt retractor according to claim 16, wherein the belt retractor includes two friction elements, the spring being arranged between the friction elements and biasing the friction elements in opposite directions into engagement with the gear.

18. The belt retractor according to claim 16, wherein the gear is ring-shaped, the at least one friction element being biased into engagement with an inner circumference of the gear by the spring.

19. The belt retractor according to claim 16, wherein the at least one friction element is formed integrally with the cam follower.

* * * * *